Jan. 21, 1964  K. J. KOLLMANN  3,118,159
SEWER SNAKE
Filed Oct. 13, 1961
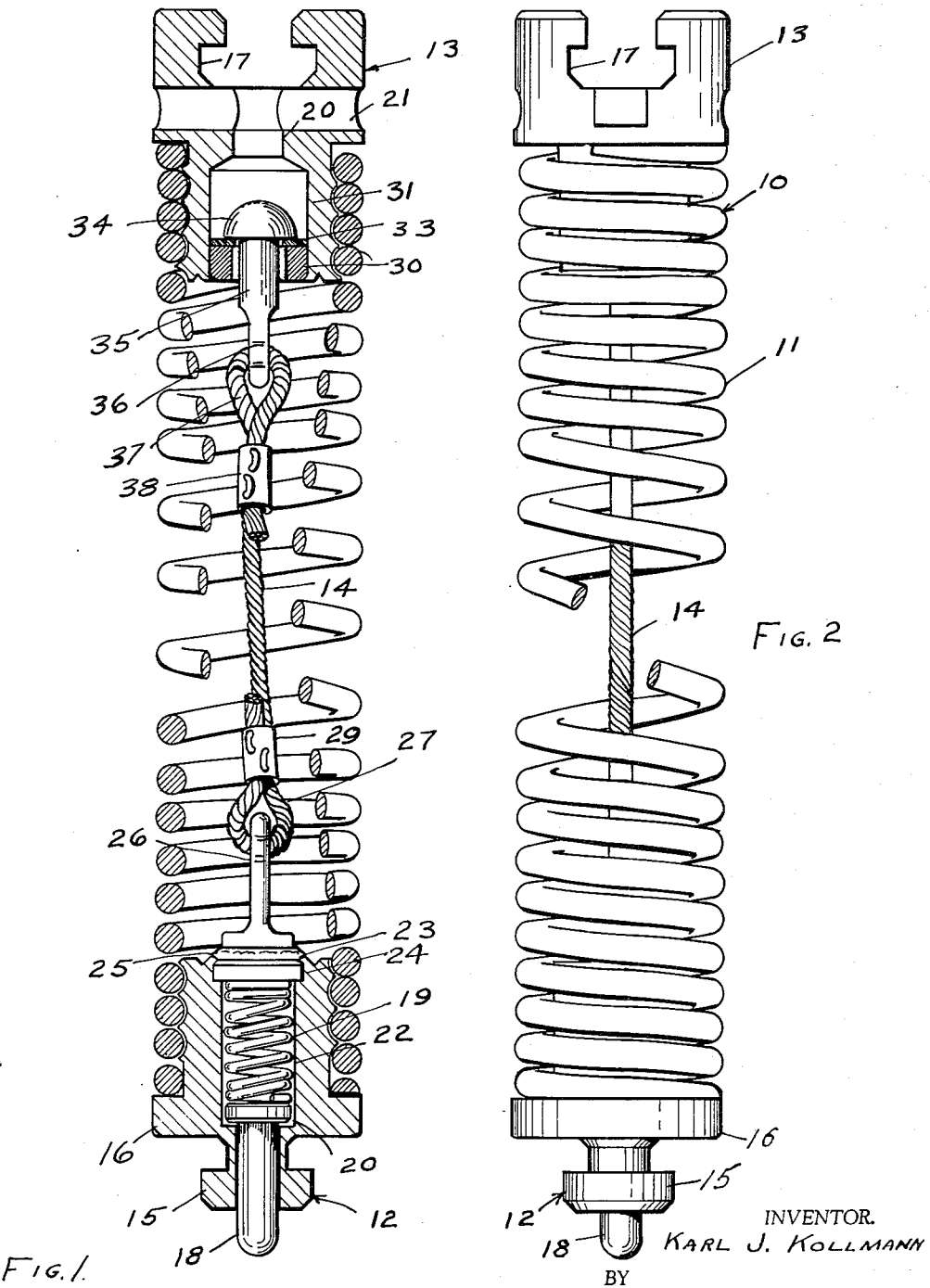
INVENTOR.
KARL J. KOLLMANN
BY
Charles L. Lovercheck
attorney

United States Patent Office 3,118,159
Patented Jan. 21, 1964

3,118,159
SEWER SNAKE
Karl J. Kollmann, 3615 Sassafras St., Erie, Pa.
Filed Oct. 13, 1961, Ser. No. 144,910
2 Claims. (Cl. 15—104.3)

This invention relates to pipe cleaning devices and, more particularly, to the type of pipe cleaning devices generally known as plumber's snakes which are generally used for cleaning drainage pipes and the like.

Such snakes are frequently made from rod or wire formed in a spiral to make a flexible shaft. During heavy usage, this spiral sometimes breaks while far down in a pipe and it is difficult, therefore, to remove the broken end without digging up the pipe.

It is, accordingly, an object of the present invention to provide an improved means for removing the broken end of a plumber's snake.

Another object of the invention is to provide a plumber's snake which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawings:

FIG. 1 is a view partly in cross section of a plumber's snake according to the invention; and FIG. 2 is a broken view of the snake shown in FIG. 1.

Now with more particular reference to the drawing, a snake 10 is made up generally of a spiral rod or wire 11 which is anchored at its ends to a male coupling member 12 and a female coupling member 13, respectively. The male coupling member 12 is adapted to be attached to a female coupling member similar to the coupling member 13 on another section of snake. Likewise, the female coupling member 13 is adapted to be attached to another male coupling member on another snake section to make up a continuous length of plumber's snake.

The spiral wire may be made of any spring steel or other suitable material and of a suitable diameter and strength for the purpose to which it is to be put. The coupling member 12 has a head 15 spaced from a body 16 of the coupling which is suitable to be received in a T-shaped slot in a coupling on another section such as slot 17 in the member 13. A pin 18 is spring loaded and urged outward to the position shown by a spring 19 so that it will be urged to enter an opening 20 in a coupling member 13. A lateral opening 21 intersects the opening 20 and may receive a drift pin to force the pin 18 to slide inwardly against the force of the spring 19 so that the head 15 may slide laterally out of the slot 17.

The spring 19 is disposed in an axial bore 22 in the member 12 and rests against the head on the pin 18 and is restrained at its other end by a washer 23 which is received in a counterbore 24 and has the material peened over it at 25 to hold it in place. An eye 26 is fixed to the washer 23 and a loop 27 on a cable 14 is threaded through the eye. The loop is held in closed position by a clamp 29 which may be any suitable cable clamp.

A hollow sleeve 30 has a bore which freely receives a pin 35. The sleeve is supported in a counterbore 31 and held therein by the material around the counterbore 31 being peened thereover. A brass washer 33 which is slightly smaller than the counterbore 31 is supported on the sleeve 30 and it provides a reduced frictional engagement with a head 34 on the pin 35. The pin 35 has an eye 36 which receives an end 37 of the cable which is bent back on itself and clamped to form an eye by means of a clamp 38.

In use, the section of snake shown is connected in series with other sections to form a snake made up of similar sections. The snake is rotated by a machine familiar to those skilled in the art which is commonly in use. The torsional force on the snake is taken up by the spring rod 11 and no torsional force is introduced into the cable 14 since if a torsional force is extended on one end, for instance at 26, the head 34 will rotate on the washer 33 and the pin 35 will swivel in its bushing. Should the cable break and the operator be unaware of the break, the headed pin 35 will continue to rotate freely on the brass washer 33 and, therefore, will not twist the cable 14. When the operator finds that there is trouble with the snake or if it is broken, he can pull it out by means of the cable 14, irrespective of the break in the cable.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A sewer snake comprising a flexible helical rod member, a first and a second end member, said end members being fixed, one at each end of said rod member, a flexible cable, one end of said flexible cable being fixed with respect to said first end member, said second end member comprising a generally cylindrical member having said helical rod member fixed to its periphery and having an axial bore therein generally concentric to said helical rod member, means fixing said helical rod member to said end members, said bore terminating in a counterbore at one end, a hollow sleeve in said counterbore adjacent the outer end thereof, said sleeve having a bore therein generally aligned with said bore in said cylindrical member, and a headed pin attached to one end of said cable and rotatably received in said sleeve bore with the head thereof disposed in said counterbore, said cable extending through said helical rod member so that in the event said helical rod member breaks, said one end member can be rotated relative to the other without twisting said cable.

2. The snake recited in claim 1 wherein said flexible cable is fixed with respect to said first end member by means of an eye member receiving an end of said cable, said eye member having a generally cylindrical portion thereon and counterbore in said first end member receiving said cylindrical portion of said eye member, and means rigidly attaching said cylindrical portion of said eye member to said first end member.

References Cited in the file of this patent
UNITED STATES PATENTS

| | | |
|---|---|---|
| 619,920 | Wrigley | Feb. 21, 1899 |
| 2,509,115 | Wait et al. | May 23, 1950 |
| 2,667,047 | Mennear | Jan. 26, 1954 |
| 2,892,649 | Kollmann | June 30, 1959 |